US008548720B2

(12) United States Patent
Shukla

(10) Patent No.: US 8,548,720 B2
(45) Date of Patent: Oct. 1, 2013

(54) SYSTEM AND METHOD FOR AIRCRAFT TAXI GATE SELECTION BASED ON PASSENGER CONNECTING FLIGHT INFORMATION

(75) Inventor: Vijay Shukla, Bangalore (IN)

(73) Assignee: Arbus Engineering Centre India, Bangalore, Karnataka (IN)

( * ) Notice: Subject to any disclaimer, the term of this patent is extended or adjusted under 35 U.S.C. 154(b) by 0 days.

(21) Appl. No.: 13/420,664

(22) Filed: Mar. 15, 2012

(65) Prior Publication Data

US 2012/0197516 A1 Aug. 2, 2012

Related U.S. Application Data

(63) Continuation-in-part of application No. 13/150,013, filed on Jun. 1, 2011.

(30) Foreign Application Priority Data

Jun. 16, 2010 (IN) ........................... 1679/CHE/2010

(51) Int. Cl.
*G06F 19/00* (2011.01)

(52) U.S. Cl.
USPC ..... 701/120; 701/3; 701/4; 701/16; 701/33.4; 701/121; 348/113; 348/114; 348/116; 348/117; 348/119; 340/945; 340/958; 370/310; 370/316; 375/130; 375/219; 342/34; 188/382

(58) Field of Classification Search
USPC ................ 701/3, 14, 16, 33.4, 120, 121, 467, 701/469; 348/113, 114, 116, 117, 119, 140, 348/141, 144, 159; 244/50, 52, 111; 340/539.1, 945, 958; 370/310, 316; 375/130, 375/219; 303/9.61, 126; 455/431; 342/34; 703/6; 188/382
See application file for complete search history.

(56) References Cited

U.S. PATENT DOCUMENTS

| | | | | |
|---|---|---|---|---|
| 5,078,340 | A * | 1/1992 | Anderberg | 244/50 |
| 7,445,178 | B2 * | 11/2008 | McCoskey et al. | 244/50 |
| 8,121,593 | B2 * | 2/2012 | Pandit et al. | 455/431 |
| 8,180,562 | B2 * | 5/2012 | Clark et al. | 701/446 |
| 2007/0051852 | A1 * | 3/2007 | McCoskey et al. | 244/137.1 |
| 2007/0161347 | A1 * | 7/2007 | Ma et al. | 455/11.1 |
| 2009/0189736 | A1 * | 7/2009 | Hayashi | 340/5.81 |
| 2009/0306887 | A1 * | 12/2009 | Clark et al. | 701/202 |
| 2010/0087190 | A1 * | 4/2010 | Pandit et al. | 455/431 |
| 2010/0299207 | A1 * | 11/2010 | Harlev et al. | 705/14.62 |

* cited by examiner

*Primary Examiner* — McDieunel Marc
(74) *Attorney, Agent, or Firm* — Prakash Nama; Global IP Services, PLLC

(57) ABSTRACT

A system and method for aircraft taxi gate selection based on passenger connecting flight information. In one embodiment, a communication link is established between an aircraft computing system and a ground station system via a communication network provided by the ground station system. Further, aircraft taxi gate selection information and the passenger connecting flight information are substantially simultaneously displayed on a display device to a pilot upon establishing the communication link. Furthermore, the pilot is allowed to select an aircraft taxi gate based on the displayed aircraft taxi gate selection information and passenger connecting flight information.

30 Claims, 11 Drawing Sheets

| POINTS OF INTEREST | 502A | 502B | 502C | 502D | 502E | 502F | 502G | 502H |
|---|---|---|---|---|---|---|---|---|
| 502A | 0 | D1 | D1 + D4 | D1 + D2 | D1 + D2 + D3 | D1 + D4 + D5 | D1 + D0 | D1 + D0 + D8 |
| 502B | D1 | 0 | D4 | D2 | D2 + D3 | D4 + D5 | D0 | D0 + D8 |
| 502C | D1 + D4 | D4 | 0 | D4 + D2 | D4 + D2 + D3 | D5 | D6 | D6 + D8 |
| 502D | D1 + D2 | D2 | D4 + D2 | 0 | D3 | D2 + D4 + D5 | D7 | D7 + D8 |
| 502E | D1 + D2 + D3 | D2 + D3 | D4 + D2 + D3 | D3 | 0 | D3 + D2 + D4 + D5 | D3 + D7 | D3 + D7 + D8 |
| 502F | D1 + D4 + D5 | D4 + D5 | D5 | D2 + D4 + D5 | D3 + D2 + D4 + D5 | 0 | D5 + D6 | D5 + D6 + D8 |
| 502G | D1 + D0 | D0 | D6 | D7 | D3 + D7 | D5 + D6 | 0 | D8 |
| 502H | D1 + D0 + D8 | D0 + D8 | D6 + D8 | D7 + D8 | D3 + D7 + D8 | D5 + D6 + D8 | D8 | 0 |

700

FIG. 7

SYSTEM AND METHOD FOR AIRCRAFT TAXI GATE SELECTION BASED ON PASSENGER CONNECTING FLIGHT INFORMATION

This is a continuation-in-part application of U.S. Non-provisional application Ser. No. 13/150,013, filed on Jun. 1, 2011, which claims the benefit of Foreign application Serial No. 1679/CHE/2010, filed on Jun. 16, 2010.

FIELD OF TECHNOLOGY

Embodiments of the present subject matter generally relate to aircraft taxi gate selection, and more particularly, to aircraft taxi gate selection based on passenger connecting flight information.

BACKGROUND

The movements of an aircraft during flight have a significant role to play in smooth handling of air traffic. Further, the movements of the aircraft on ground in an airport are also of great importance in this regard. After landing, the aircraft must be moved from its landing position to a parking position which is commonly known as a gate.

In existing methods, a control facility (e.g., a control center in the airport) may provide gate information to a pilot or the pilot may select the gate from available gates for taxiing the aircraft. However, the selected gate may be far from connecting flight departure gates of passengers on board the aircraft. In such cases, the passengers may end up travelling longer distance than they have to reach their connecting flight departure gates. This can be tedious and time consuming to the passengers and may also result in the passengers missing the connecting flights. This problem can get amplified if the airport is very big and the distances between the connecting flight departure gates at various terminals are far apart.

SUMMARY

A system and method for aircraft taxi gate selection based on passenger connecting flight information are disclosed. According to one aspect of the present subject matter, a communication link is established between an aircraft computing system and a ground station system via a communication network provided by the ground station system. Further, aircraft taxi gate selection information and the passenger connecting flight information are substantially simultaneously displayed on a display device, to a pilot, upon establishing the communication link. Furthermore, the pilot is allowed to select an aircraft taxi gate based on the displayed aircraft taxi gate selection information and passenger connecting flight information.

According to another aspect of the present subject matter, the communication link is established between the aircraft computing system and the ground station system via the communication network provided by the ground station system. Further, an estimated aircraft arrival time and the passenger connecting flight information are obtained upon establishing the communication link. Furthermore, an optimized aircraft taxi gate selection option is automatically provided, on the display device, to the pilot based on the estimated aircraft arrival time and the passenger connecting flight information. In addition, the pilot is allowed to select the provided optimized aircraft taxi gate selection option for taxiing the aircraft.

According to yet another aspect of the present subject matter, the system includes the ground station system and the aircraft computing system residing in the aircraft. Further, the aircraft computing system includes a processor, memory coupled to the processor, and a display device coupled to the memory. Furthermore, the memory includes an aircraft taxi gate selection module. In addition, the system includes the communication network for establishing the communication link between the aircraft computing system and the ground station system. The communication network is provided by the ground station system. Also, the aircraft taxi gate selection module substantially simultaneously displays the aircraft taxi gate selection information and the passenger connecting flight information on the display device, to the pilot, upon establishing the communication link. Moreover, the aircraft taxi gate selection module allows the pilot to select the aircraft taxi gate based on the displayed aircraft taxi gate selection information and passenger connecting flight information.

According to one aspect of the present subject matter, the system includes the ground station system and the aircraft computing system residing in the aircraft. Further, the aircraft computing system includes the processor, the memory coupled to the processor, and the display device coupled to the memory. Furthermore, the memory includes the aircraft taxi gate selection module. In addition the ground station system includes a ground station computing system. Moreover, the ground station computing system includes a processor and memory coupled to the processor. Also, the memory includes an aircraft taxi gate advisory module. Further, the system includes the communication network for establishing the communication link between the aircraft computing system and the ground station system. The communication network is provided by the ground station system.

Furthermore, the aircraft taxi gate advisory module obtains the estimated aircraft arrival time and the passenger connecting flight information upon establishing the communication link. In addition, the aircraft taxi gate advisory module automatically provides the optimized aircraft taxi gate selection option, on the display device, to the pilot based on the estimated aircraft arrival time and the passenger connecting information. Also, the aircraft taxi gate selection module allows the pilot to select the provided optimized aircraft taxi gate selection option for taxiing the aircraft.

According to another aspect of the present subject matter, a non-transitory computer-readable storage medium for aircraft taxi gate selection based on the passenger connecting flight information, having instructions that, when executed by a computing device causes the computing device to perform one or more methods described above.

The systems and methods disclosed herein may be implemented in any means for achieving various aspects. Other features will be apparent from the accompanying drawings and from the detailed description that follow.

BRIEF DESCRIPTION OF THE DRAWINGS

Various embodiments are described herein with reference to the drawings, wherein:

FIG. 7 is an exemplary distance matrix formed by using the distance network, such as the one shown in FIG. 6;

The drawings described herein are for illustration purposes only and are not intended to limit the scope of the present disclosure in any way.

DETAILED DESCRIPTION

A system and method for aircraft taxi gate selection based on passenger connecting flight information are disclosed. In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
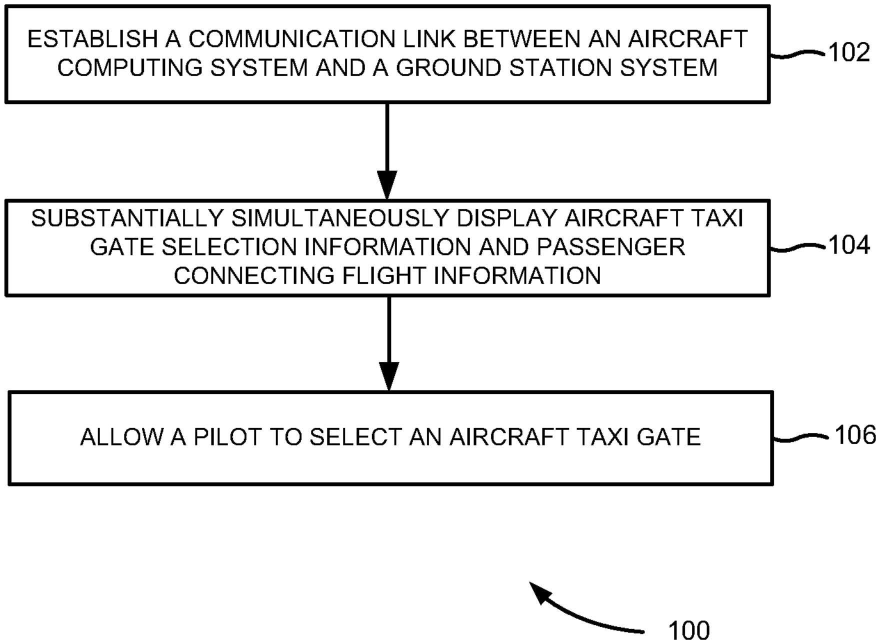
FIG. 1 illustrates a flow chart of an exemplary method for aircraft taxi gate selection based on passenger connecting flight information.

FIG. 1 illustrates a flow chart 100 of an exemplary method for aircraft taxi gate selection based on passenger connecting flight information. At block 102, a communication link is established between an aircraft computing system, such as a flight management system (FMS), an aircraft cockpit system, an aircraft navigation system and the like and a ground station system (e.g., an airport server) via a communication network (e.g., worldwide interoperability for microwave access (WiMax)) provided by the ground station system. In one embodiment, the communication link is established between the aircraft computing system and the ground station system via the communication network by an aircraft within a range of the communication network at a transit airport.

At block 104, aircraft taxi gate selection information and the passenger connecting flight information are substantially simultaneously displayed on a display device, to a pilot, upon establishing the communication link. In one embodiment, the aircraft taxi gate selection information and passenger connecting flight information are substantially simultaneously displayed using an aircraft taxi gate selection and guidance application residing in the aircraft computing system. Exemplary passenger connecting flight information includes updated passenger connecting flight information. For example, the passenger connecting flight information includes a connecting flight departure gate, an estimated connecting flight departure time, time of boarding, current status, time of arrival and the like associated with connecting flights of the one or more passengers on board the aircraft. In one embodiment, passenger information such as name, address, passenger connecting flight information and the like are obtained and stored in an airline database, which can be accessed by airline personnel at every other level, when the passenger is booking flight tickets. Exemplary levels include boarding pass counters, boarding pass kiosks, final boarding gates and the like. Further, each level is linked to the airline database which acts as an airline central database. The airline central database access can be configured in the ground station computing system, which can interact with the airline database to meet incoming request.

In one exemplary implementation, one or more pilot selectable aircraft taxiing and ground services are displayed on the display device of the aircraft computing system, to the pilot, upon establishing the communication link. For example, pilot selectable taxiing and ground services includes taxiway services, connecting flight services, aircraft logbook services, pilot request services, airport terminal information services and the like. This is explained in more detail with reference to FIG. 3. Further, the aircraft taxi gate selection information including an array of pilot selectable and non-selectable gates at the transit airport and passenger connecting flight information are substantially simultaneously displayed on the display device using ground station data residing in the ground station system via the communication link upon selecting the taxiway services and connecting flight services, respectively, by the pilot.

At block 106, the pilot is allowed to select an aircraft taxi gate based on the displayed aircraft taxi gate selection information and passenger connecting flight information. In one embodiment, the aircraft taxi gate includes a gate nearest to connecting flight departure gates associated with the connecting flights of the one or more passengers on board the aircraft.

Figure 2:
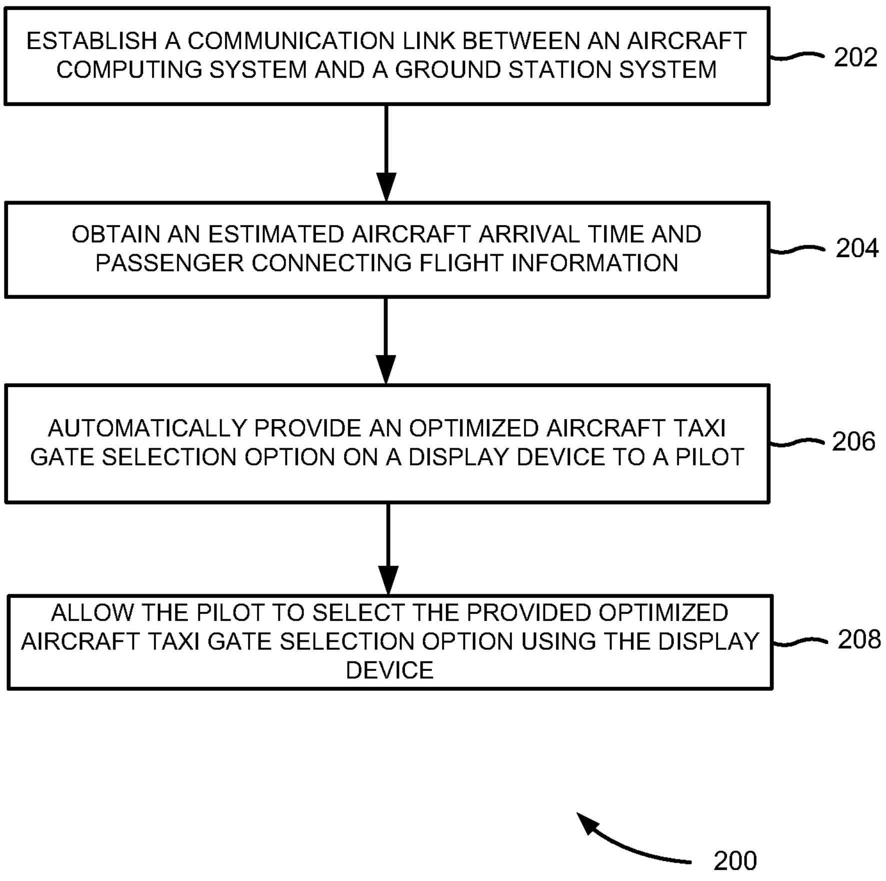
FIG. 2 illustrates another flow chart of an exemplary method for aircraft taxi gate selection based on the passenger connecting flight information.

Referring now to FIG. 2, which illustrates another flow chart 200 of an exemplary method for aircraft taxi gate selection based on passenger connecting flight information. At block 202, a communication link is established between an aircraft computing system and a ground station system via a communication network provided by the ground station system. In one embodiment, the communication link is established between the aircraft computing system and the ground station system via the communication network by an aircraft within a range of the communication network at a transit airport.

At block 204, an estimated aircraft arrival time and the passenger connecting flight information are obtained upon establishing the communication link. For example, the passenger connecting flight information includes a connecting flight departure gate, an estimated connecting flight departure time, time of boarding, current status, time of arrival and the like associated with connecting flights of the one or more passengers on board the aircraft. At block 206, an optimized aircraft taxi gate selection option is automatically provided, on a display device, to a pilot based on the estimated aircraft arrival time and the passenger connecting flight information. In one embodiment, time difference between the estimated aircraft arrival time and connecting flight departure time is computed. Further, passenger maximum distance travel information is computed using the computed time difference. In one embodiment, the passenger maximum distance travel information is computed using an equation:

$$\text{passenger maximum distance travel information } (D)=S*T$$

where S is an average walking speed of a passenger and T is the computed time difference.

Furthermore, an array of gates is formed based on available gates for aircraft taxi gate selection and the computed passenger maximum distance travel information. In addition, the optimized aircraft taxi gate selection option is automatically provided to the pilot using the array of gates. At block 208, the pilot is allowed to select the provided optimized aircraft taxi gate selection option for taxiing the aircraft.

Figure 3:
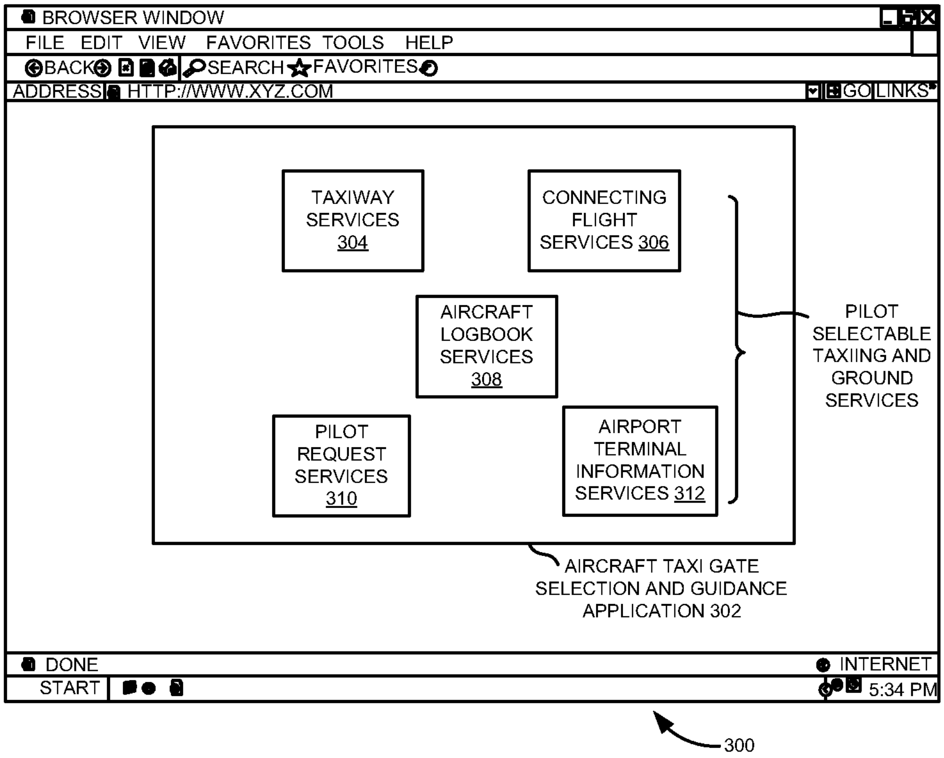
FIG. 3 illustrates a screenshot of an aircraft taxi gate selection and guidance application displaying pilot selectable taxiing and ground services, according to one embodiment.

Referring now to FIG. 3, which illustrates a screenshot 300 of an aircraft taxi gate selection and guidance application 302 displaying pilot selectable taxiing and ground services, according to one embodiment. In one embodiment, when an aircraft approaches substantially near a landing position and when a communication link is established between an aircraft computing system (e.g., an aircraft computing system 806 of FIG. 8) and a ground station system (e.g., a ground station 804 of FIG. 8), the aircraft taxi selection and guidance application 302 is displayed on a display device (e.g., a display device 904 of FIG. 9) of the aircraft computing system. The display device may be a dedicated display device or may be the display device associated with a FMS, an electronic flight bag (EFB), and the like associated with the aircraft computing system. In one embodiment, the pilot selectable taxiing and ground services are displayed in the form of pilot selectable buttons.

As shown in FIG. 3, the pilot selectable taxiing and ground services includes taxiway services 304, connecting flight services 306, aircraft logbook services 308, pilot request services 310, and airport terminal information services 312. When the pilot selects one of the displayed pilot selectable taxiing and ground services, information associated with the selected pilot selectable taxiing and ground service is displayed on the display device.

For example, information associated with the taxiway services 304 may include position data of all exits from the landing position of the aircraft, aircraft taxi gate selection information, actual path information to follow to reach the selected aircraft taxi gate from the landing position, alternate path information in case of non-feasibility of an actual path, and the like. The information associated with the connecting flight services 306 may include information about different aircrafts at an airport and their schedule information, relevant data associated with an aircraft, such as gate of departure, an estimated time of departure, time of boarding, current status, aircraft final destination, time of arrival, and the like, passenger connecting flight information, and the like. The information associated with the aircraft logbook services 308 may include reports about problems and malfunctions encountered during a flight. For example, the pilot may enter the problems and malfunctions in an aircraft logbook during the flight which is available for airport authorities when the communication link is established.

The information associated with pilot request services 310 may include specific services requested by the pilot from the airport authorities. The specific services may include requirement of a wheel chair for a passenger, support for luggage, re-fuelling request, conveyance from the aircraft taxi gate to a transit airport exit, and the like. The information associated with the transit airport terminal information services 312 may include information, such as a transit airport current temperature and pressure, an airport elevation, facility available around the aircraft taxi gate or the airport, pilot and passenger useable information about the transit airport, and the like.

Figure 4:
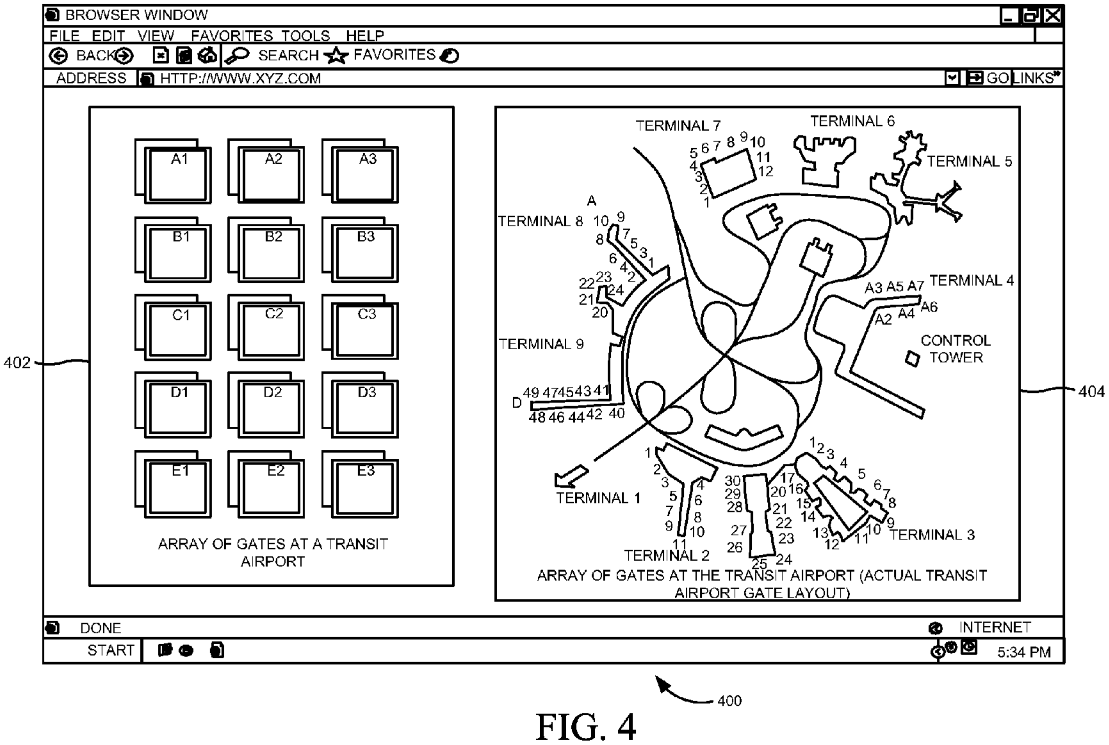
FIG. 4 illustrates a screenshot displaying an array of gates at a transit airport in the form of soft selectable icons and an actual transit airport gate layout, according to one embodiment.

Referring now to FIG. 4, which illustrates a screenshot 400 displaying an array of gates at a transit airport in the form of soft selectable icons 402 and an actual transit airport gate layout 404, according to one embodiment. For example, the array of gates 402 includes pilot selectable and non-selectable gates at the transit airport. In one embodiment, the array of gates 402 and the actual airport gate layout 404 are displayed on the display device when the pilot selects the taxiway services 304, such as the one shown in FIG. 3. Further, the pilot is allowed to select an aircraft taxi gate from the array of gates.

In one exemplary implementation, the aircraft taxi gate selection information and passenger connecting flight information are displayed on the display device when the pilot selects the taxiway services 304 and connecting flight services 306, respectively, such as those shown in FIG. 3. Further, the pilot selects the aircraft taxi gate from the array of gates 402 for taxiing the aircraft based on displayed aircraft taxi gate selection information and the passenger connecting flight information. The pilot may also consider airport terminal information data, pilot request form, and aircraft logbook data while selecting the aircraft taxi gate for taxiing the aircraft. This is explained in more detail with reference to FIG. 10. In another exemplary implementation, an optimized aircraft taxi gate selection option is automatically provided to the pilot by the ground station system based on the passenger connecting flight information upon establishing the communication link. Further, the pilot is allowed to select the provided aircraft taxi gate selection option for taxiing the aircraft. This is explained in more detail with reference to FIG. 11.

Furthermore, the selected aircraft taxi gate is placed in a standby lock mode. In addition, the selected aircraft taxi gate, in the standby lock mode, is displayed in a different contrast mode from the pilot selectable gates on the display device. Moreover, the standby lock mode is replaced by a permanent lock mode when the aircraft is taxied at the selected aircraft taxi gate.

Figure 5:
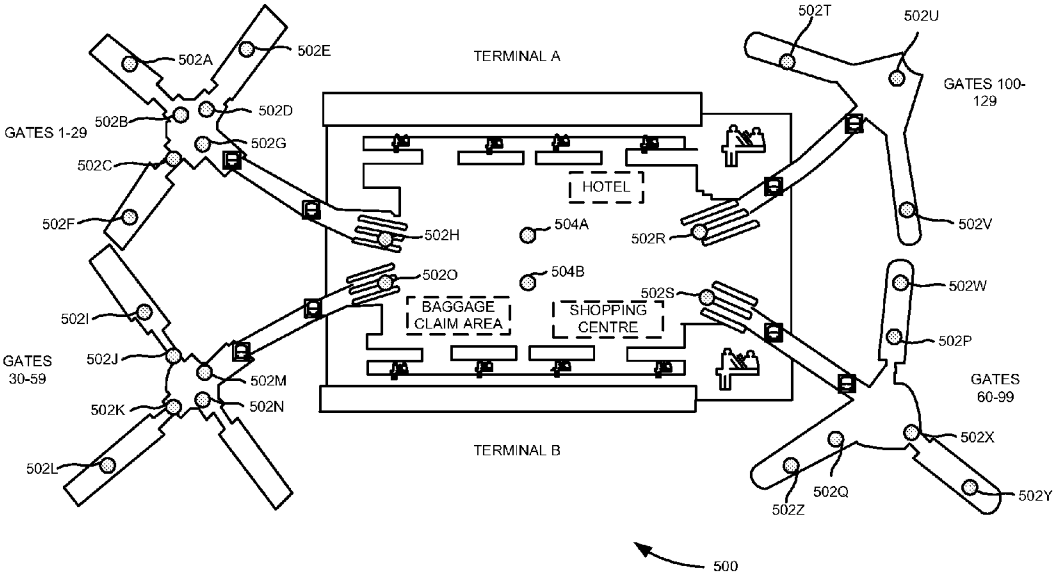
FIG. 5 is a schematic illustrating exemplary points of interest within a transit airport terminal area.

Referring now to FIG. 5, which is a schematic 500 illustrating exemplary points of interest 502A-Z and 504A-B within a transit airport terminal area. For example, the points of interest 502A-Z and 504A-B are imaginary points at various locations in the transit airport terminal area. Exemplary points of interest include restaurants, restrooms, lounges, ticketing information centers, airport information centers, smoking stations, baggage claim area, business centers, gates at the transit airport and the like. In one embodiment, the points of interest 502A-Z and 504A-B are used as reference points for forming a distance matrix (e.g., a distance matrix 700). For forming the distance matrix, distances between the points of interest 502A-Z and 504A-B are computed. This is explained below in more detail with reference to FIG. 6.

Figure 6:
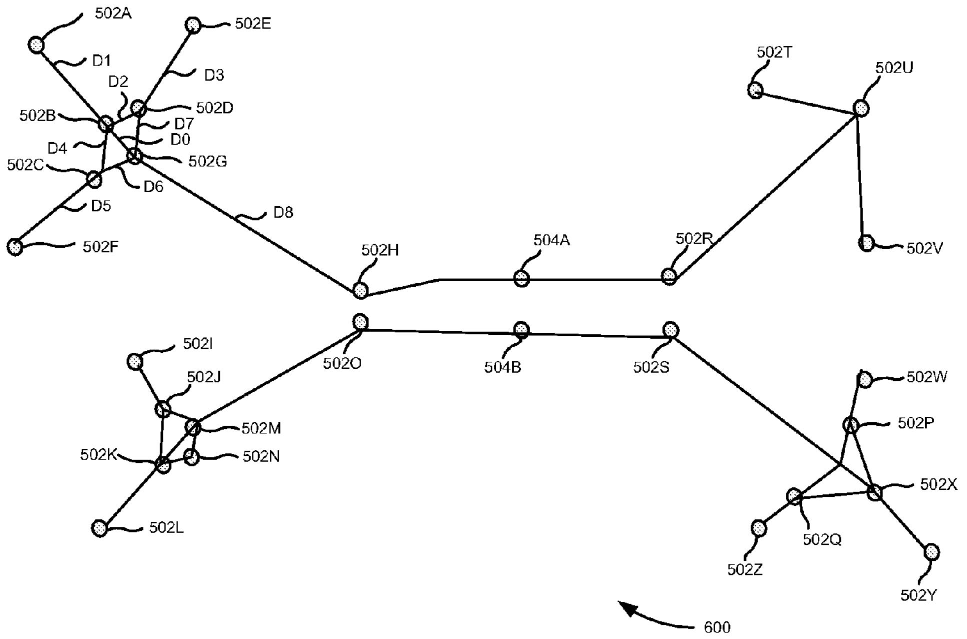
FIG. 6 illustrates a distance network between some of the points of interest, such as those shown in FIG. 5, according to one embodiment.

Referring now to FIG. 6, which illustrates a distance network 600 between some of the points of interest 502A-H, such as those shown in FIG. 5, according to one embodiment. The distance network 600 includes distance information between the points of interest 502A-H. As shown in FIG. 6, distance between the points of interest 502A and 502B is D1. Further, distance between the points of interest 502B and 502D is D2. Furthermore, distance between the points of interest 502D and 502E is D3. In addition, distance between the points of interest 502B and 502C is D4. Also, distance between the points of interest 502C and 502F is D5. Further, distance between the points of interest 502C and 502G is D6. Furthermore, distance between the points of interest 502G and 502D is D7. In addition, distance between the points of interest 502G and 502H is D8. Moreover, distance between the points of interest 502B and 502G is D0. For example, the distances between the points of interest 502A-H can be several kilometers based on complexity of the transit airport terminal area.

Referring now to FIG. 7, which illustrates an exemplary distance matrix 700 formed by using the distance network 600, such as the one shown in FIG. 6. The distance matrix 700 includes the distance information associated with the points of interest 502A-H, such as those shown in FIG. 6. For example, the distance matrix 700 includes shortest distance information associated with the points of interest 502A-H. In one embodiment, the ground station system includes the distance matrix 700. In this embodiment, the distance matrix 700 includes distance information associated the points of interests, for example, gates at the transit airport. Further, the ground station system automatically provides the optimized aircraft taxi gate selection option to the pilot as an advisory on the display device based on the passenger connecting flight information. This is explained below in more detail with reference to FIG. 11. In another embodiment, the distance matrix 700 includes distance information associated with the points of interest, for example, airline specific gates at the transit airport. In this embodiment, the optimized aircraft taxi gate selection option is automatically provided to the pilot based on the shortest distance from one of the airline specific gates till connecting flight departure gates associated with the connecting flights of one or more passengers on board the aircraft.

Figure 8:
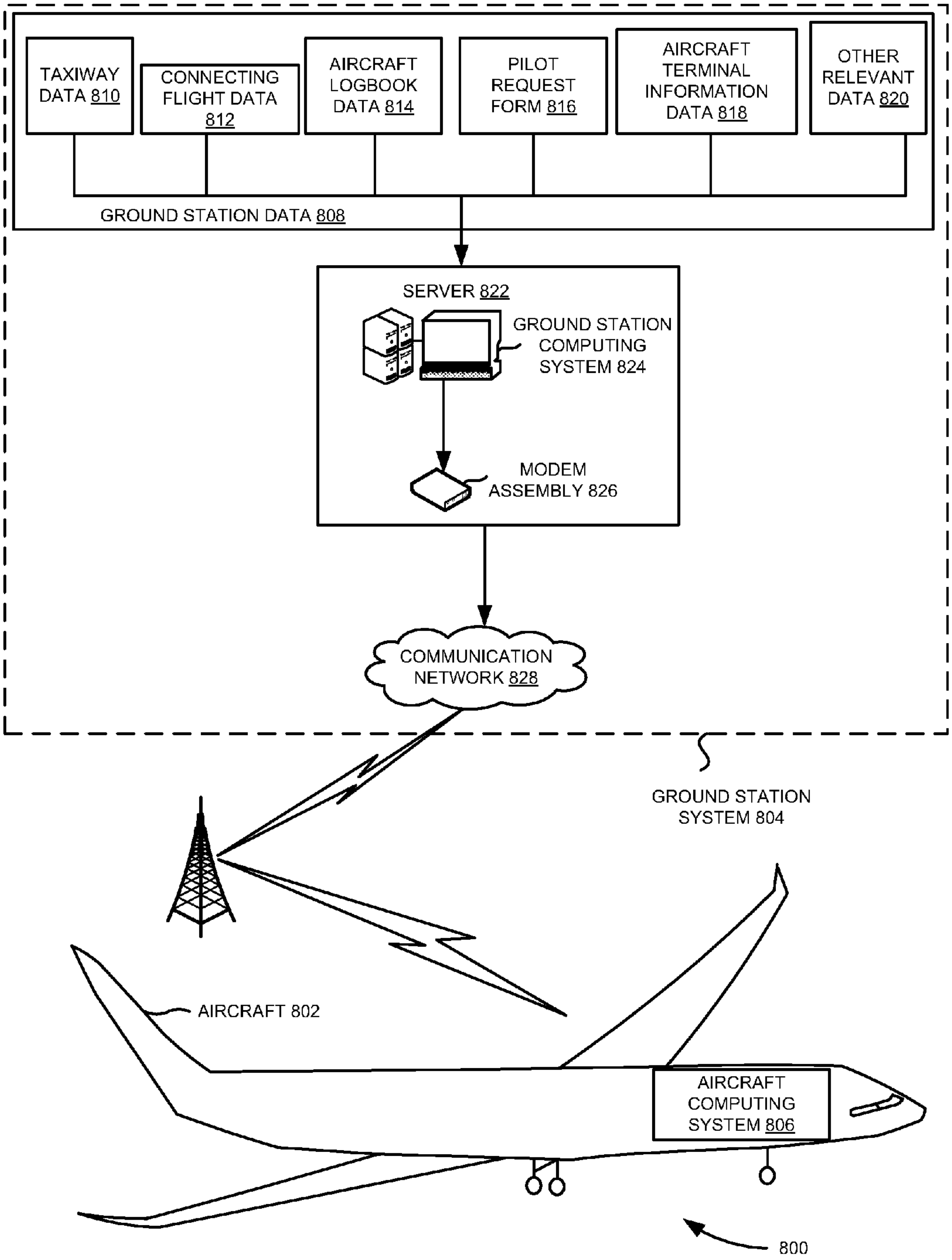
FIG. 8 illustrates a system for aircraft taxi gate selection based on the passenger connecting flight information, according to one embodiment.

Referring now to FIG. 8, which illustrates a system 800 for aircraft taxi gate selection based on the passenger connecting flight information, according to one embodiment. As shown in FIG. 8, the system 800 includes an aircraft 802 and a ground station system 804. For example, the ground station system 804 includes an airport server and the like. Further, the aircraft 802 includes an aircraft computing system 806. For example, the aircraft computing system 806 includes a flight management system (FMS), an aircraft cockpit system, an aircraft navigation system and the like. Furthermore, the ground station system 804 includes a server 822. In addition, the server 822 includes a ground station computing system 824, a modem assembly 826 and ground station data 808 residing in the ground station computing system 824. In one embodiment, the ground station data 808 includes taxiway data 810, connecting flight data 812, aircraft logbook data 814, pilot request form 816, aircraft terminal information data 818 and other relevant data 820. In one embodiment, the ground station data 808 is updated as and when the pilot selects an aircraft taxi gate for taxiing the aircraft.

In operation, a communication link is established between the aircraft computing system 806 and the ground station system 804 via a communication network 828 provided by the ground station system 804. The communication network 828 includes WiMax (e.g., 3.5 GHz radio frequency signal). In one embodiment, the communication link is established between the aircraft computing system 806 and the ground station system 804 via the communication network 828 by the aircraft 802 within a range of the communication network 828 at the transit airport.

Further, the pilot is allowed to select the aircraft taxi gate upon establishing the communication link. In one embodiment, the aircraft computing system 806 allows the pilot to select the aircraft taxi gate based on the passenger connecting flight information and aircraft taxi gate selection information upon establishing the communication link. This is explained in more detail with reference to FIG. 10. In another embodiment, the ground station system 804 automatically provides the optimized aircraft taxi gate selection option to the pilot based on the passenger connecting flight information. Further in this embodiment, the aircraft computing system 806 allows the pilot to select the provided aircraft taxi gate selection option for taxiing the aircraft. This is explained in more detail with reference to FIG. 11.

Figure 9:
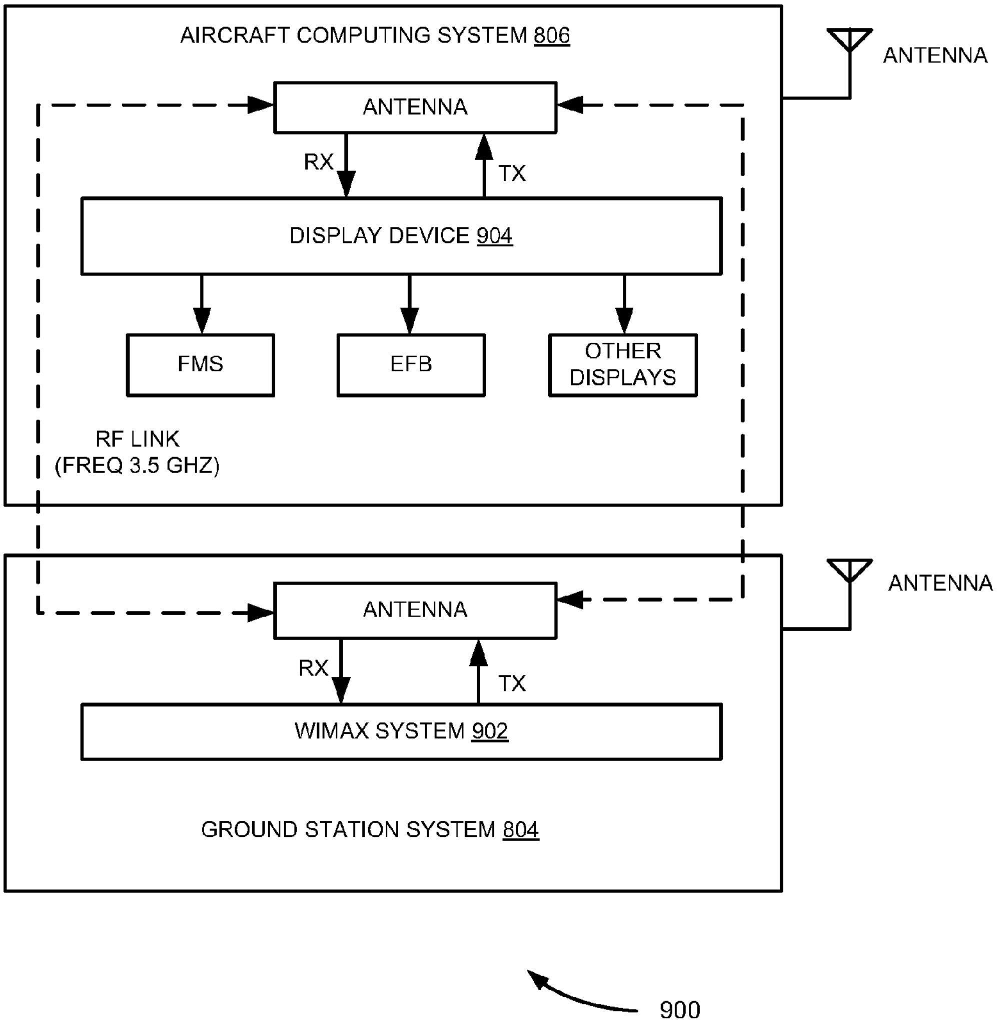
FIG. 9 is a block diagram illustrating major components of the system shown in FIG. 8, according to one embodiment.

Referring now to FIG. 9, which is a block diagram 900 illustrating major components of the system 800 shown in FIG. 8, according to one embodiment. As shown in FIG. 9, the block diagram 900 includes the ground station system 804 communicatively coupled to the aircraft computing system 806 via a WiMax system 902. Further, the aircraft computing system 806 includes a display device 904 with an integrated modem. For example, the display device 904 is an interactive display. Furthermore, the aircraft computing system 806 displays the aircraft taxi gate selection and guidance application 302, such as the one shown in FIG. 3, on the display device 904 upon establishing the communication link.

In one embodiment, the aircraft computing system 806 displays a route map on the display device 904 when the aircraft taxi gate is selected for taxiing the aircraft 802. The route map may be also displayed on other non-dedicated displays associated with FMS, EFB, and the like. For example, the route map includes a path between the landing position and the selected aircraft taxi gate. The landing position of the aircraft 802 may be obtained using a global positioning system (GPS). Based on the displayed route map, the pilot taxies and guides the aircraft 802 to the selected aircraft taxi gate. Further, the system 800 may be configured with a feedback mechanism in order to generate warnings to the pilot via messages on the display device 904. This informs the pilot of possible deviation from the track thereby enabling accuracy in the path followed to reach the selected aircraft taxi gate.

Figure 10:
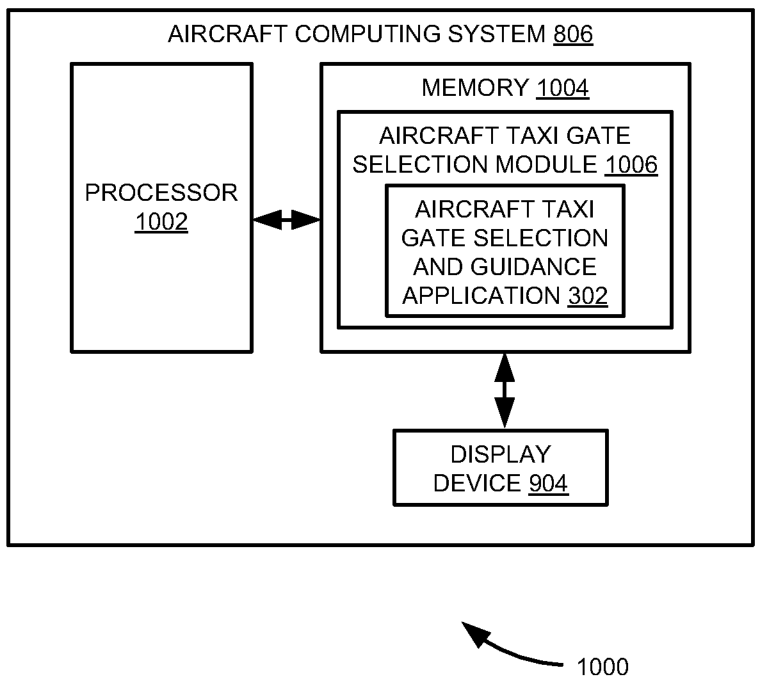
FIG. 10 illustrates an aircraft computing system, such as the one shown in FIG. 9, including an aircraft taxi gate selection module for allowing a pilot to select the aircraft taxi gate for taxiing the aircraft, using the process described with reference to FIG. 1, according to one embodiment.

Referring now to FIG. 10, which illustrates an aircraft computing system 806, such as the one shown in FIG. 9, including an aircraft taxi gate selection module 1006 for allowing the pilot to select the aircraft taxi gate, using the process described with reference to FIG. 1, according to one embodiment. As shown in FIG. 10, the aircraft computing system 806 includes a processor 1002, memory 1004 and the display device 904. Further as shown in FIG. 10, the memory 1004 includes the aircraft taxi gate selection module 1006. Furthermore, the aircraft taxi gate selection module includes an aircraft taxi gate selection and guidance application 302. In addition, the processor 1002 is coupled to the memory 1004. Moreover, the display device 904 is coupled to the memory 1004.

In operation, a communication link is established between the aircraft computing system 806 and the ground station system 804, such as those shown in FIG. 8, via the communication network 828 provided by the ground station system 804. In one embodiment, the communication link between the aircraft computing system 806 and the ground station system 804 is established via the communication network 828 by the aircraft 802 within the range of the communication network at the transit airport. Further, the aircraft taxi gate selection module 1006 substantially simultaneously displays aircraft taxi gate selection information and the passenger connecting flight information on the display device 904, to the pilot, upon establishing the communication link. In one embodiment, the aircraft taxi gate selection module 1006 substantially simultaneously displays aircraft taxi gate selection information and passenger connecting flight information using the aircraft taxi gate selection and guidance application 302. Exemplary passenger connecting flight information includes updated passenger connecting flight information. For example, the passenger connecting flight information includes a connecting flight departure gate, an estimated connecting flight departure time, time of boarding, current status, and/or time of arrival associated with connecting flights of the one or more passengers on board the aircraft 802.

In one embodiment, the aircraft taxi gate selection module 1006 displays one or more pilot selectable aircraft taxiing and ground services, such as those shown in FIG. 3, on the display device 904, to the pilot, using the aircraft taxi gate selection and guidance application 302 upon establishing the communication link. For example, pilot selectable taxiing and ground services includes taxiway services 304, connecting flight services 306, aircraft logbook services 308, pilot request services 310, airport terminal information services 312, such as those shown in FIG. 3. Further, the aircraft taxi gate selection module 1006 substantially simultaneously displays the aircraft taxi gate selection information including the array of pilot selectable and non-selectable gates at the transit airport and the passenger connecting flight information on the display device 904 using ground station data 808, such as the one shown in FIG. 8, via the communication link upon selecting the taxiway services 304 and connecting flight services 306, respectively, by the pilot.

Furthermore, the aircraft taxi gate selection module 1006 allows the pilot to select the aircraft taxi gate based on the displayed aircraft taxi gate selection information and passenger connecting flight information. In one embodiment, the aircraft taxi gate includes a gate nearest to connecting flight departure gates associated with the one or more passengers on board the aircraft 802, such as the one shown in FIG. 8.

Figure 11:
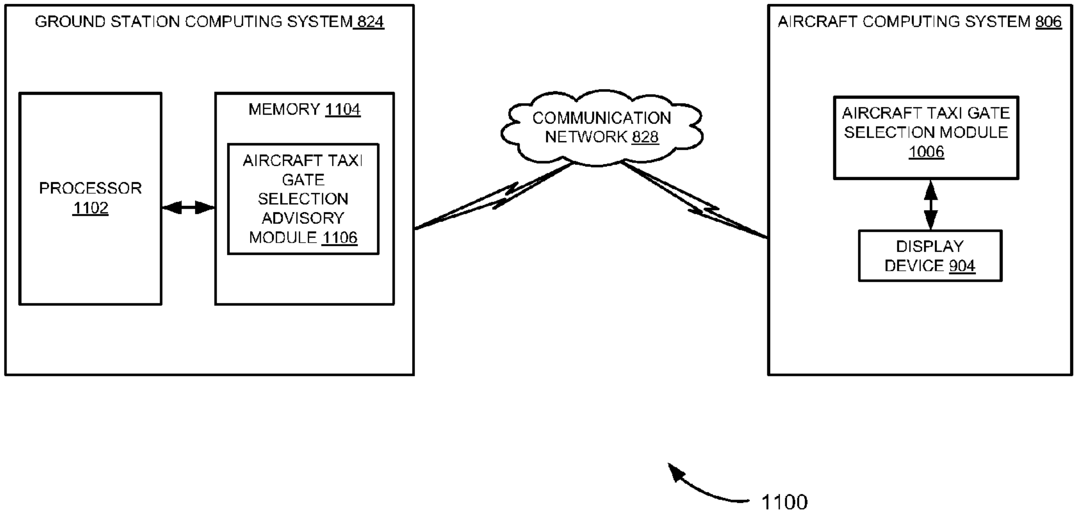
FIG. 11 is a block diagram illustrating a ground station computing system, such as the one shown in FIG. 8, including an aircraft taxi gate advisory module for automatically providing an optimized aircraft taxi gate selection option to the pilot, using the process described with reference to FIG. 2, according to one embodiment.

Referring now to FIG. 11, which is a block diagram 1100 that illustrates a ground station computing system 824 including a aircraft taxi gate advisory module 1106 for automatically providing the optimized aircraft taxi gate selection option to the pilot based on the passenger connecting flight information, using the process described with reference to FIG. 2, according to one embodiment. As shown in FIG. 11, the block diagram 1100 includes the ground station computing system 824 and the aircraft computing system 806. Further, the ground station computing system 824 includes a processor 1102, memory 1106, and the aircraft taxi gate selection advisory module 1106. Furthermore, the aircraft computing system 806 includes the aircraft taxi gate selection module 1006 and the display device 904. In addition, the memory 1104 is coupled to the processor 1102. Also, the display device 904 is coupled to the aircraft taxi gate selection module 1006.

In one embodiment, the communication link is established between the aircraft computing system 806 and the ground station system 804, such as the one shown in FIG. 8, via the communication network 828 provided by the ground station system 804. In one embodiment, the communication link between the aircraft computing system 806 and the ground station system 804 is established via the communication network 828 by the aircraft 802, such as the one shown in FIG. 8, within the range of the communication network at the transit airport. Particularly, the communication link is established between the aircraft computing system 806 and the ground station computing system 824.

Further, the aircraft taxi gate advisory module 1106 obtains an estimated aircraft arrival time and the passenger connecting flight information upon establishing the communication link. For example, the passenger connecting flight information includes a connecting flight departure gate, an estimated connecting flight departure time, time of boarding, current status, time of arrival and the like associated with connecting flights of the one or more passengers on board the aircraft 802. Furthermore, the aircraft taxi gate advisory module 1106 automatically provides the optimized aircraft taxi gate selection option on the display device 904 to the pilot based on the estimated aircraft arrival time and connecting flight departure time. In one embodiment, the aircraft taxi gate advisory module 1106 computes time difference between the estimated aircraft arrival time and connecting flight departure time. In one exemplary implementation, the aircraft taxi gate advisory module 1106 computes the time difference based on domestic to international departures or vice-versa. The time difference is considered as international travel requires passengers to complete formalities such as immigration, security check and the like at the transit airport. Further, the aircraft taxi gate advisory module 1106 computes passenger maximum distance travel information using the computed time difference.

For example, the passenger maximum distance travel information is computed using an equation:

$$\text{passenger maximum distance travel information } (D)=S*T$$

where S is an average walking speed of a passenger and T is the computed time difference.

In addition, the aircraft taxi gate advisory module 1106 forms an array of gates based on available gates for aircraft taxi gate selection and the computed passenger maximum distance travel information. For example, the array of gates is formed by including the gates at the transit airport within which the aircraft could taxi so that the passengers are able to reach a first priority connecting flight departure gate at or before departure time. The array of gates contains gates from nearest gate number information to farthest gate number information from the first priority connecting flight departure gate. In some embodiments, the aircraft taxi gate advisory module 1106 computes other connecting flight departure gate's distances upon computing the first priority connecting flight departure gate distance if there are multiple connecting flight departure gates based on the passenger maximum distance travel information. The aircraft taxi gate advisory module 1106 identifies a nearest gate from the array of gates and automatically provides the optimized aircraft taxi gate selection option to the pilot for taxiing the aircraft. For example, the array of gates formation involves a comparison and sorting mechanism using which an optimized aircraft taxi gate location is identified and displayed on the display device 904, to the pilot, as an advisory message. Moreover, the aircraft taxi gate selection module 1006 allows the pilot to select the provided optimized aircraft taxi gate selection option for taxiing the aircraft.

In various embodiments, the systems and methods described in FIGS. 1 through 11 propose aircraft taxi gate selection based on passenger connecting flight information. Further, the selected aircraft taxi gate is a gate near to the connecting flight departure gates associated with the connecting flights of the one or more passengers on board the aircraft. Thus, the travel distance of the passengers onboard the aircraft from an aircraft arrival gate to their connecting flight departure gates is reduced.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for aircraft taxi gate selection based on passenger connecting flight information, comprising:

establishing a communication link between an aircraft computing system and a ground station system via a communication network provided by the ground station system;

substantially simultaneously displaying aircraft taxi gate selection information and the passenger connecting flight information on a display device to a pilot upon establishing the communication link; and allowing the pilot to select an aircraft taxi gate based on the displayed aircraft taxi gate selection information and passenger connecting flight information.

2. The method of claim 1, wherein substantially simultaneously displaying the aircraft taxi gate selection information and passenger connecting flight information on the display device to the pilot upon establishing the communication link comprises:

displaying one or more pilot selectable aircraft taxiing and ground services on the display device, of the aircraft computing system, to the pilot upon establishing the communication link, wherein the one or more pilot selectable taxiing and ground services are selected from the group consisting of taxiway services, connecting flight services, aircraft logbook services, pilot request services, and airport terminal information services; and substantially simultaneously displaying the aircraft taxi gate selection information and passenger connecting flight information on the display device using ground station data residing in the ground station system via the communication link upon selecting the taxiway services and connecting flight services, respectively, by the pilot.

3. The method of claim 2, wherein the passenger connecting flight information comprises a connecting flight departure gate, an estimated connecting flight departure time, time of boarding, current status, and/or time of arrival associated with connecting flights of the one or more passengers on board the aircraft.

4. The method of claim 1, wherein the aircraft taxi gate selection information and passenger connecting flight information are substantially simultaneously displayed on the display device using an aircraft taxi gate selection and guidance application residing in the aircraft computing system upon establishing the communication link.

5. The method of claim 1, wherein establishing the communication link between the aircraft computing system and the ground station system comprises:

establishing the communication link between the aircraft computing system and the ground station system via the communication network by an aircraft within a range of the communication network at a transit airport.

6. The method of claim 5, wherein the communication network comprises worldwide interoperability for microwave access (WiMax).

7. The method of claim 1, wherein the aircraft computing system is selected from the group consisting of a flight management system (FMS), an aircraft cockpit system, and an aircraft navigation system.

8. A method for aircraft taxi gate selection based on passenger connecting flight information, comprising:

establishing a communication link between an aircraft computing system and a ground station system via a communication network provided by the ground station system;

obtaining an estimated aircraft arrival time and the passenger connecting flight information upon establishing the communication link; and automatically providing an optimized aircraft taxi gate selection option on a display device to a pilot based on the estimated aircraft arrival time and the passenger connecting flight information.

9. The method of claim 8, further comprising:

allowing the pilot to select the provided optimized aircraft taxi gate selection option using the display device for taxiing the aircraft.

10. The method of claim 8, wherein the passenger connecting flight information comprises a connecting flight departure gate, an estimated connecting flight departure time, time of boarding, current status, and/or time of arrival associated with connecting flights of the one or more passengers on board the aircraft.

11. The method of claim 10, wherein automatically providing the optimized aircraft taxi gate selection option on the display device to the pilot based on the estimated aircraft arrival time and connecting flight departure time comprises:

computing time difference between the estimated aircraft arrival time and connecting flight departure time;

computing passenger maximum distance travel information using the computed time difference;

forming an array of gates based on available gates for aircraft taxi gate selection and the computed passenger maximum distance travel information; and automatically providing the optimized aircraft taxi gate selection option to the pilot using the array of gates.

12. The method of claim 11, wherein the passenger maximum distance travel information is computed using an equation:

$$\text{passenger maximum distance travel information } (D)=S*T$$

where S is an average walking speed of a passenger and T is the computed time difference.

13. A system for aircraft taxi gate selection based on passenger connecting flight information, comprising:

a ground station system;

an aircraft computing system residing in an aircraft, wherein the aircraft computing system comprises:

a processor;

memory coupled to the processor, wherein the memory comprises:

an aircraft taxi gate selection module; and a display device coupled to the memory; and a communication network for establishing a communication link between the aircraft computing system and the ground station system, wherein the communication network is provided by the ground station system, wherein the aircraft taxi gate selection module substantially simultaneously displays aircraft taxi gate selection information and the passenger connecting flight information on the display device to a pilot upon establishing the communication link and wherein the aircraft taxi gate selection module allows the pilot to select an aircraft taxi gate based on the displayed aircraft taxi gate selection information and passenger connecting flight information.

14. The system of claim 13, wherein the aircraft taxi gate selection module is configured to:

display one or more pilot selectable aircraft taxiing and ground services on the display device, of the aircraft computing system, to the pilot upon establishing the communication link, wherein the one or more pilot selectable taxiing and ground services are selected from the group consisting of taxiway services, connecting flight services, aircraft logbook services, pilot request services, and airport terminal information services; and substantially simultaneously display the aircraft taxi gate selection information and passenger connecting flight information on the display device using ground station data residing in the ground station system via the communication link upon selecting the taxiway services and connecting flight services, respectively, by the pilot.

15. The system of claim 14, wherein the passenger connecting flight information comprises a connecting flight departure gate, an estimated connecting flight departure time, time of boarding, current status, and/or time of arrival associated with connecting flights of the one or more passengers on board the aircraft.

16. The system of claim 14, wherein the aircraft taxi gate selection module is configured to:

substantially simultaneously display the aircraft taxi gate selection information and passenger connecting flight information on the display device using an aircraft taxi gate selection and guidance application residing in the aircraft computing system upon establishing the communication link.

17. The system of claim 13, wherein establishing the communication link between the aircraft computing system and the ground station system comprises:

establishing the communication link between the aircraft computing system and the ground station system via the communication network by an aircraft within a range of the communication network at a transit airport.

18. The system of claim 17, wherein the communication network comprises worldwide interoperability for microwave access (WiMax).

19. The system of claim 13, wherein the aircraft computing system is selected from the group consisting of a flight management system (FMS), an aircraft cockpit system, and an aircraft navigation system.

20. A system for aircraft taxi gate selection based on passenger connecting flight information, comprising:

a ground station system, wherein the ground station system comprises:

a ground station computing system, wherein the ground station computing system comprises:

a processor; and memory coupled to the processor, wherein the memory comprises:

an aircraft taxi gate advisory module;

an aircraft computing system residing in an aircraft, wherein the aircraft computing system comprises:

a display device; and a communication network for establishing a communication link between the aircraft computing system and the ground station system, wherein the communication network is provided by the ground station system, wherein the aircraft taxi gate advisory module obtains an estimated aircraft arrival time and the passenger connecting flight information upon establishing the communication link, and wherein the aircraft taxi gate advisory module automatically provides an optimized aircraft taxi gate selection option on the display device to a pilot based on the estimated aircraft arrival time and the passenger connecting flight information.

21. The system of claim 20, further comprising:

an aircraft taxi gate selection module residing in the aircraft computing system, wherein the aircraft taxi gate selection module allows the pilot to select the provided optimized aircraft taxi gate selection option using the display device for taxiing the aircraft.

22. The system of claim 20, wherein the passenger connecting flight information comprises a connecting flight departure gate, an estimated connecting flight departure time, time of boarding, current status, and/or time of arrival associated with connecting flights of the one or more passengers on board the aircraft.

23. The system of claim 22, wherein the aircraft taxi gate advisory module is configured to:

compute time difference between the estimated aircraft arrival time and connecting flight departure time;

compute passenger maximum distance travel information using the computed time difference;

form an array of gates based on available gates for the aircraft taxi gate selection and the computed passenger maximum distance travel information; and automatically provide the optimized aircraft taxi gate selection option to the pilot using the array of gates.

24. The system of claim 23, wherein the passenger maximum distance travel information is computed using an equation:

$$\text{passenger maximum distance travel information } (D)=S*T$$

where S is an average walking speed of a passenger and T is the computed time difference.

25. At least one non-transitory computer-readable storage medium for aircraft taxi gate selection based on passenger connecting flight information, having instructions that, when executed by a computing device cause the computing device to:

establish a communication link between an aircraft computing system and a ground station system via a communication network provided by the ground station system;

substantially simultaneously display aircraft taxi gate selection information and the passenger connecting flight information on a display device to a pilot upon establishing the communication link; and allow the pilot to select an aircraft taxi gate based on the displayed aircraft taxi gate selection information and passenger connecting flight information.

26. The at least one non-transitory computer-readable storage medium of claim 25, wherein substantially simultaneously displaying the aircraft taxi gate selection information and passenger connecting flight information on the display device to the pilot upon establishing the communication link comprises:

displaying one or more pilot selectable aircraft taxiing and ground services on the display device, of the aircraft computing system, to the pilot upon establishing the communication link, wherein the one or more pilot selectable taxiing and ground services are selected from the group consisting of taxiway services, connecting flight services, aircraft logbook services, pilot request services, and airport terminal information services; and substantially simultaneously displaying the aircraft taxi gate selection information and passenger connecting flight information on the display device using ground station data residing in the ground station system via the communication link upon selecting the taxiway services and connecting flight services, respectively, by the pilot.

27. At least another non-transitory computer-readable storage medium for aircraft taxi gate selection based on passenger connecting flight information, having instructions that, when executed by a computing device cause the computing device to:

establish a communication link between an aircraft computing system and a ground station system via a communication network provided by the ground station system;

obtain an estimated aircraft arrival time and the passenger connecting flight information upon establishing the communication link; and automatically provide an optimized aircraft taxi gate selection option on a display device to a pilot based on the estimated aircraft arrival time and the passenger connecting flight information.

28. The at least another non-transitory computer-readable storage medium of claim 27, further comprising:

allowing the pilot to select the provided optimized aircraft taxi gate selection option using the display device for taxiing the aircraft.

29. The at least another non-transitory computer-readable storage medium of claim 27, wherein the passenger connecting flight information comprises a connecting flight departure gate, an estimated connecting flight departure time, time of boarding, current status, and/or time of arrival associated with connecting flights of the one or more passengers on board the aircraft.

30. The at least another non-transitory computer-readable storage medium of claim 29, wherein automatically providing the optimized aircraft taxi gate selection option on the display device to the pilot based on the estimated aircraft arrival time and connecting flight departure time comprises:

computing time difference between the estimated aircraft arrival time and connecting flight departure time;

computing passenger maximum distance travel information using the computed time difference;

forming an array of gates based on available gates for aircraft taxi gate selection and the computed passenger maximum distance travel information; and automatically providing the optimized aircraft taxi gate selection option to the pilot using the array of gates.

* * * * *